United States Patent [19]

Ross

[11] Patent Number: 4,690,606
[45] Date of Patent: Sep. 1, 1987

[54] MOBILE LOADERS

[75] Inventor: Christopher P. Ross, West Drayton, England

[73] Assignee: Ipeco Europe Limited, Essex, England

[21] Appl. No.: 798,688

[22] PCT Filed: Mar. 28, 1985

[86] PCT No.: PCT/GB85/00121
§ 371 Date: Nov. 4, 1985
§ 102(e) Date: Nov. 4, 1985

[87] PCT Pub. No.: WO85/04387
PCT Pub. Date: Oct. 10, 1985

[30] Foreign Application Priority Data

Mar. 30, 1984 [GB] United Kingdom ............... 8408346

[51] Int. Cl.$^4$ .......................... H02J 7/00; B60P 1/44
[52] U.S. Cl. ...................................... 414/495; 187/25; 254/9 C; 318/139; 318/376; 320/14
[58] Field of Search ......................... 414/495; 254/9 C; 320/14; 318/139, 376; 187/17, 24, 25

[56] References Cited

U.S. PATENT DOCUMENTS

| 3,116,910 | 1/1964 | Moore et al. | |
|---|---|---|---|
| 3,237,921 | 3/1966 | Jay. | |
| 3,524,563 | 8/1970 | McCartney et al. | |
| 3,568,804 | 3/1971 | Olsen | 187/25 |
| 3,620,565 | 11/1971 | Eggert, Jr. et al. | 414/495 X |
| 3,947,744 | 3/1976 | Grace et al. | 320/14 X |
| 4,237,410 | 12/1980 | Erickson et al. | 320/14 |

FOREIGN PATENT DOCUMENTS

| 931849 | 3/1948 | France. |
| 1115799 | 4/1956 | France. |
| 1211725 | 5/1960 | France. |
| 2369206 | 5/1978 | France. |
| 2113175 | 8/1983 | United Kingdom. |

Primary Examiner—Robert J. Spar
Assistant Examiner—Stuart J. Millman
Attorney, Agent, or Firm—William R. Hinds

[57] ABSTRACT

A mobile loader of the type used for loading and unloading the cargo holds of aircraft is described. The loader operates by electric motors driving both traction apparatus and loading platform elevation. The loader comprises a chassis having a variable height platform, the platform being connected to the chassis by linkage for maintaining the platform in a substantially level attitude irrespective of platform height, mechanical lifting apparatus for varying the height of the platform with respect to the chassis, an electric motor drive connected by transmission apparatus to the mechanical lifting apparatus for raising the platform, an electrical energy storage (such as a battery pack) for powering the electric motor drive, control apparatus whereby the electric motor drive may be switched to function as an electrical generator to provide retardation of the platform when being lowered, and controllable circuitry to direct the electrical energy generated during lowering the platform into the electrical energy storage.

6 Claims, 11 Drawing Figures

MOBILE LOADERS

The present invention relates to loaders and particularly to the type of mobile loader which incorporates a variable height platform used for loading and unloading freight in, for example, the cargo holds of aircraft.

Mobile loaders are essential equipment for the loading and unloading of cargo into and from the holds of aircraft.

Such loaders often employ two platforms. One platform, usually referred to as a bridge provides an interface with the sill of the cargo door and remains in a substantially constant position with respect to the aircraft. The second platform cycles up and down either taking cargo from the bridge or delivering cargo to the bridge.

Heretofore, the second platform has always been raised and lowered by means of hydraulic systems acting through appropriate mechanical linkages which ensure that the platform maintains a substantially horizontal attitude.

The loaders are frequently moved by diesel engines with all the attendant problems of noise, air pollution, fuel spillages, safety hazards and high maintenance cost etc.

In order to move away from diesel engines some designers have followed a conversion approach whereby substantially standard vehicles have been taken and converted to electric power by the installation of motors and batteries, etc. Usually, however, the hydraulic platform actuating system has been retained with hydraulic pumps driven by electric motors. The major problem with this approach is that the resulting loaders have low performance and low energy efficiency, especially with respect to load lifting performance.

It has been calculated that for a typical service on a Boeing 747 aircraft where the hold is unloaded on arrival and then loaded for departure that over 55% of the energy required from a loader's power systems are required in the raising and lowering of the loading platform. Nearly 30% of the remaining demand is taken up in driving the loader to and from and around the aircraft.

It is, therefore, considered to be a prerequisite that lifting efficiency is of paramount importance in mobile loaders.

Hydraulic systems are notably inefficient in terms of energy consumption, much energy being wasted in pumping fluids. In the case of mobile loaders in airports once energy has been expended in raising the loading platform it is all totally wasted during lowering of the platform. The platform is usually lowered by bleeding-off the hydraulic fluid through valves, usually into a reservoir for use again later in raising the platform. The energy efficiency of hydraulically operated systems is typically about 35%. A result of such low energy efficiency is that the overall performance of such loaders is relatively low. Their driving speed is low and endurance is relatively short.

By employing mechanical systems instead of hydraulics to raise the platform, the mobile loader of the present invention provides for recharging the batteries when the loading platform is being lowered by switching the drive motor into an electrical generator.

According to one aspect of the present invention a method of operating a loader comprises raising a load by mechanical lifting means, the mechanical means being driven by at least one electric motor means powered from battery means and then lowering a load, the descent being controlled by regenerative braking and wherein the at least one electric motor means is switched to generator means by control means and power from the generator means is used to at least partially recharge the battery means.

Preferably the mechanical lifting means includes re-circulating ball-screw jacks. The lifting platform may be a relatively conventional design wherein the platform is maintained in a substantially level attitude by a known scissor arrangement. The re-circulating ball-screw jacks may be connected to the platform via the nut of the screw such that as the screw is rotated the nut and platform are caused to be raised.

Preferably two re-circulating ball-screws may be used and may be driven by a common electric motor via a transmission.

During, for example, the unloading of an aircraft cargo hold where a substantially empty platform is raised and a fully loaded platform is lowered it has been found that a net overall gain in power may be realized at the batteries. It will be appreciated that the heavier the load being lowered the greater is the power generated during regenerative braking, thus giving more charging of the batteries.

It has been found that taken overall, that is, during loading and unloading of aircraft, the energy efficiency of the present invention is nearly 60%. This includes all of the losses associated with battery conversion, controls, motors and transmissions.

According to a second aspect of the present invention apparatus for the raising and/or lowering of loads comprises a chassis having a variable height platform, the platform being connected to the chassis by means for maintaining the platform in a substantially level attitude irrespective of platform height, mechanical lifting means for varying the height of the platform with respect to the chassis, electric motor drive means connected by transmission means to the mechanical lifting means for raising the platform, electrical energy storage means for powering the electric motor drive means and control means whereby the electric motor drive means may be switched to electrical generator means to provide retardation of the platform when being lowered and means to direct the electrical energy generated during lowering of the platform into the electrical energy storage means.

Preferably the chassis may also include thereon a second platform or bridge to provide a loading or unloading interface with the aircraft cargo hold. The bridge may be raised and lowered by any known method and since it remains at a substantially constant height during the aircraft loading/unloading operation it may be found convenient to use hydraulic operation.

The chassis also preferably includes wheels and other traction means and drive and steering means for some of the wheels such that loader operation may be substantially autonomous. It will be appreciated that the loader could be in the form of a passive device which may be towed by a tug to and from the aircraft. However, it is generally considered that to be fully autonomous in operation is more economic and efficient as a method of operation. Preferably the chassis is also driven by electric motors and one type of motor which has been found particularly advantageous are hub mounted motors in the drive wheels. Steerable drive wheels may be employed and these have been found to give excellent maneuverability to the loader.

Preferably the transmission means to the mechanical lifting means also includes a fail-safe brake which effectively locks the platform at the desired height. The brake is released by electrical signals to allow lowering of the platform. In the event of an electrical power failure the brake is automatically applied to prevent an uncontrolled descent of the platform.

According to a feature of the invention the mechanical lifting means are provided by re-circulating ball-screw jacks. Preferably two such jacks are employed to give rigidity to the platform when being either raised or lowered. It has been found that such devices allow very precise control of platform height in operation. During raising and lowering of loads of up to 7000 kg height control at any position of better than 0.5 mm may be reliably obtained.

Re-circulating ball-screw jacks are very efficient in operation by virtue of having rolling element bearings. On release of the locking brake the platform begins to descend, accelerating due to gravity. In the descending mode the electric motor used for raising the platform is switched by the control means into an electrical generator and the current generated is used to retard the platform and to at least partially recharge the batteries. Such a technique is known as regenerative braking and is a known technique used with electric powered vehicles to dissipate kinetic energy of a moving vehicle. Even with moving vehicles the energy produced during regenerative braking is only 10% or so from the kinetic energy. In the present invention regenerative braking is used to convert the potential energy of the raised platform into useful energy part of which may be recouped to provide longer endurance and more economical operation.

If hydraulic lifting means were to be employed it would not be practicable to turn a hydraulic pump into a motor for driving a generator/motor because of the low efficiency of the hydraulic transmission in this mode. The costs of installing such a system based on hydraulics would far outweigh any energy which may be generated for battery recharging.

In order that the invention may be more fully understood embodiments will now be described by way of example only with reference to the accompanying drawings of which:

FIGS. 1(a), (b), (c) and (d) show a loader according to the invention in side and front elevations with bridge and platform raised and plan view and front elevation with bridge and platform lowered respectively;

Figure 4A:
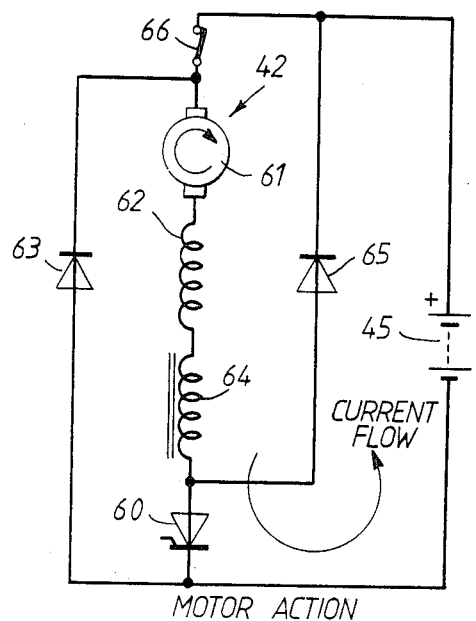
Figure 5A:
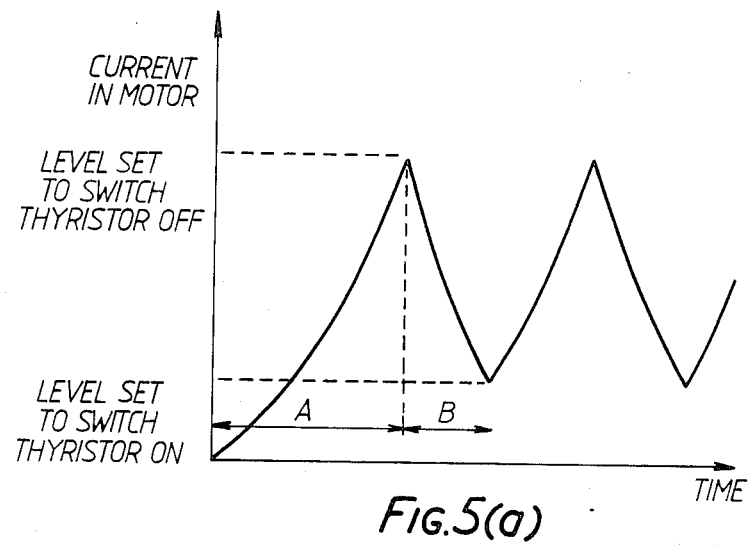

FIGS. 4(a), (b) and (c) show schematic views of an electrical circuit for controlling the motor current during raising and lowering of the platform in a loader according to the invention; and FIGS. 5(a) and (b) show graphs of current flow in the motor armature and to the batteries during regenerative braking of the descending load in a loader according to the invention.

Figure 1A:
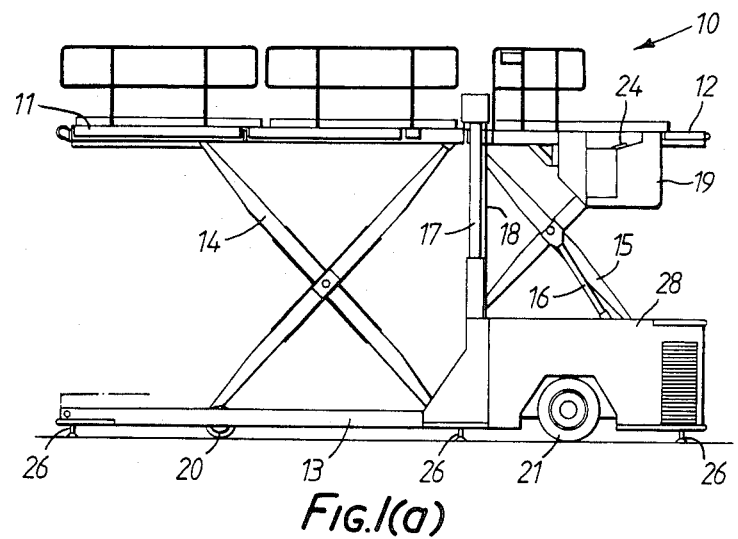
Figure 1C:
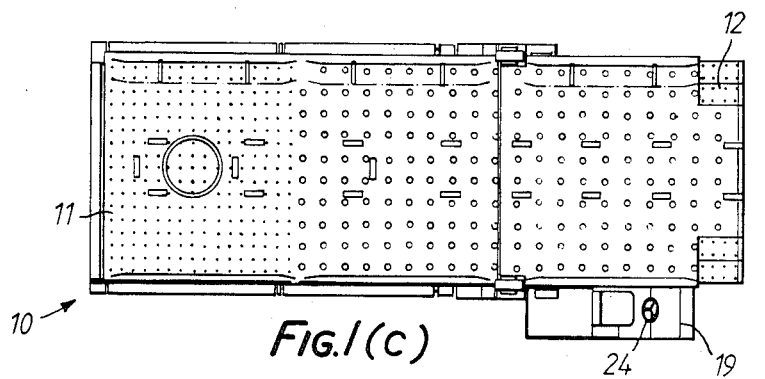
Figures 1B, 1D:
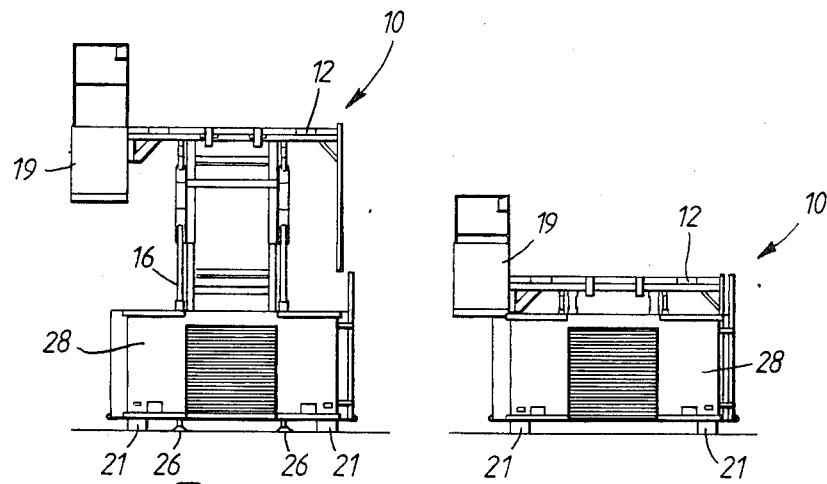

Referring to the drawings, where the same features have common reference numerals, FIGS. 1(a) and 1(b) show a loader 10 having loading-/unloading platform 11 and bridge 12 in the raised position. The platform 11 is supported and maintained in a level attitude with respect to a chassis 13 by a scissor jack arrangement 14. The bridge 12 is similarly supported on a scissor jack arrangement 15 which is raised and lowered by hydraulic rams 16. The platform 11 is raised by means of re-circulating ball-screw jacks 17 and leaf chains 18, the chains being secured to the platform 11 at one end and to the chassis 13 at the other end. Attached to the bridge 12 is a cab 19 for an operator; within the cab 19 is a control panel (not shown). The chassis 13 is supported on four wheels, the rear pair 20 are free-wheeling and the front pair 21 incorporate steering king-pins (not shown) and hub-mounted drive motors (not shown). Also in the cab 19 is a steering wheel 24 linked to the front wheels 21 by power-actuated hydraulic steering means (not shown). At strategic points on the chassis 13 are retractable hydraulic jacks 26 to stabilize the loader 10 when in operation at an aircraft (not shown). Mounted on the front of the chassis 13 is a housing 28 in which batteries (not shown) motor/generator means (not shown) and associated transmission means (not shown) etc. are housed. These are described in detail in FIGS. 2, 3 and 4.

The platform raising and lowering mechanism comprises the platform 11 linked to two re-circulating ball-screw jacks 17 as described with reference to FIG. 1. The screws 17a are connected through gearbox transmission units 40 and shafts 41 to a series-wound D.C. motor/generator 42. Also on one of the shafts 41 is a brake 43. Connected to the motor/generator 42 is a motor/generator control unit 44 (described in greater detail in FIG. 4) and an energy source 45 which in this case is a 72 volt battery pack. Also connected to the control unit 44 is a function controller 46. In operation to lift a load 47 on the platform 11 the function controller selects motor drive and rotation of the output shaft of the motor 42 rotates the screws 17a of the re-circulating ball-screw jacks 17 via the shafts 41 and transmission units 40. The nuts 17b of the ball-screw jacks are prevented from turning by being fixed in housings associated with the chassis 13 thus rotation of the screws 17a causes the nuts 17b to rise up the screws so elevating the platform 11 and load 47. When the platform 11 has reached a desired height the screws 17a are stopped and the brake 43 is automatically engaged and the load 47 removed from the platform. The function controller 46 now selects generator operation and the platform 11 is ready to be lowered. The platform is allowed to accelerate to a predetermined rate of descent (if there is a load on the platform the rate of acceleration will be greater). When the desired rate of descent is achieved the generator 42 exerts a retarding force on the platform and prevents the rate of descent from increasing. This occurs regardless of the load 47 on the platform 11. The motor/generator 42 is driven by virtue of the screws 17a revolving by virtue of the load imposed through the nuts 17b. The revolving screws 17a drive the motor/-generator 42 via the transmission units 40 and the shafts 41. As the platform 11 nears the desired lower level the retardation on the platform is increased by the motor/-generator 42 and the platform is decelerated and brought to a gentle stop within 0.5 mm of the desired position. The operation of the motor/generator control unit 44 is described below with respect to FIG. 4.

Figure 2:
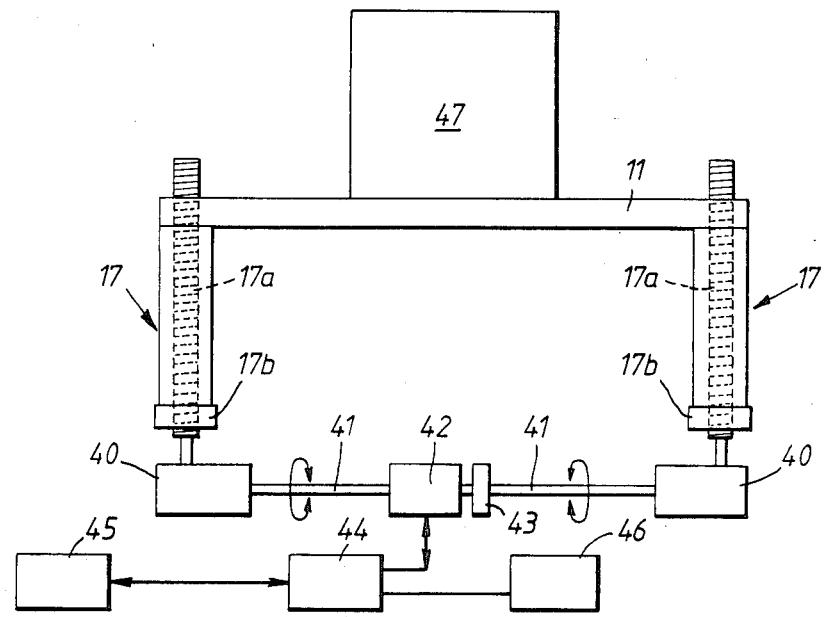
FIG. 2 shows a schematic view of a platform lifting mechanism and control system of a loader according to the invention.
Figure 3:
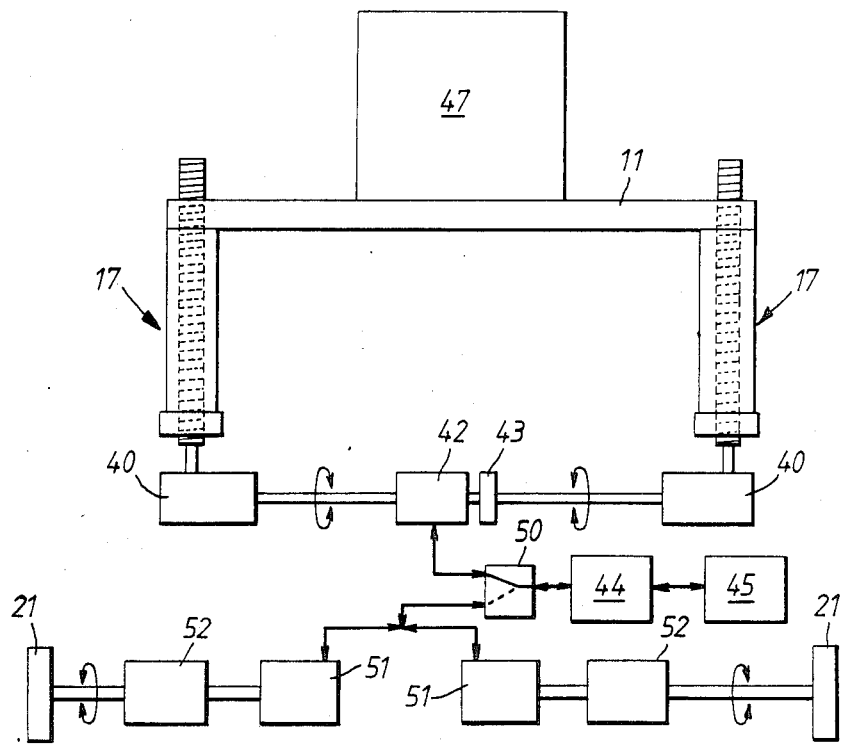
FIG. 3 shows a schematic view of an alternative control system of a loader according to the invention.

FIG. 3 shows a similar platform lifting mechanism and control system therefor as that shown in FIG. 2. In addition, however, there is a further switching unit 50 to allow the motor/generator control unit 44 to control the operation of a further electric motor or motors 51 for driving the road wheels 21 of the loader. The motors 51 may be integral hub motor/gearbox units or may drive through separate transmission units 52.

It will be appreciated that a common control unit 44 may be employed since the platform 11 is never raised or lowered whilst the loader 10 is in motion and vice versa.

Figures 4B, 4C:
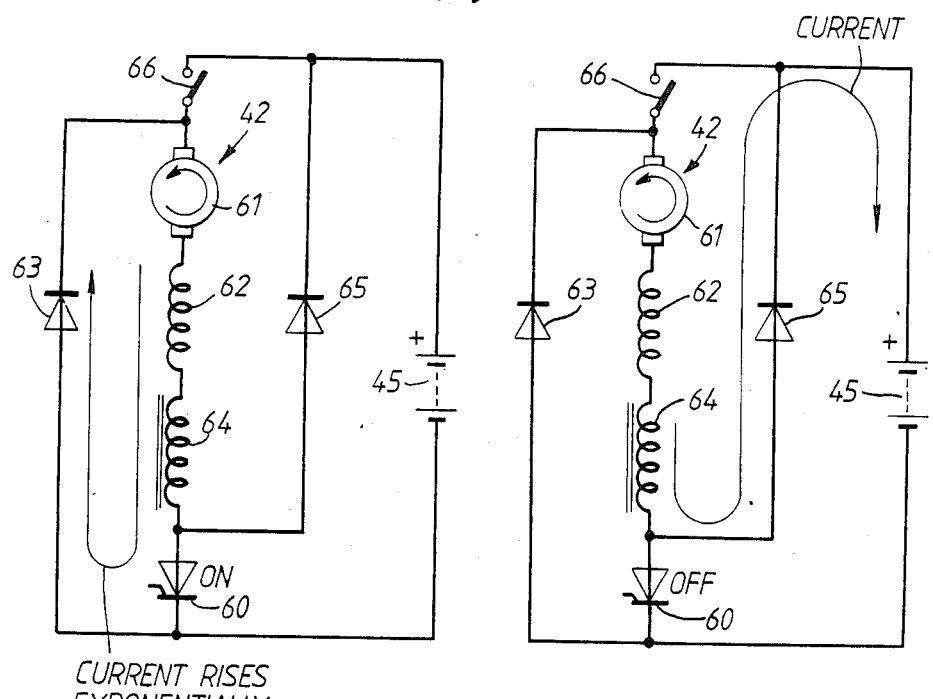

The operation of the motor controller 44 will now be described with reference to FIGS. 4(*a*), (*b*) and (*c*) and FIGS. 5(*a*) and (*b*). When the platform 11 is being raised the current flow through the motor/generator 42 in the motor mode is generally as shown in FIG. 4(*a*). The thyristor 60 may be switched on or off with varying relative periods of on to off to achieve controlled current flow through the armature 61 of the motor 42 and field coils 62. In this case the motor is driving the screws 17*a* to effect lifting of the platform 11. Also in the electrical circuit is a regenerative braking diode 63, an inductance 64, a motor diode 65, a switch 66 and the battery pack 45. In the platform lifting mode the switch 66 is closed.

With the platform 11 in the descending mode where the mass of the platform 11 and any load 47 thereon imposes a torque on the screw 17*a* via the nuts 17*b* and causes the motor armature 61 to accelerate in the reverse direction to the motor mode (see FIGS. 4(*b*) and (*c*)). To control the rate of descent of the platform 11 a counter-balancing torque is applied to the armature 61 by the technique of regenerative braking. In FIG. 4(*b*) the switch 66 is opened thus breaking the circuit continuity above the armature 61, there is, therefore, no current flow from the battery pack 45. As the armature 61 coils cut through the magnetic field generated by the field coil 62 a voltage is generated. With the thyristor ON (FIG. 4(*b*)), current will flow through the regenerative braking diode 63, armature 61, field coil 62 and inductance 64. Because of the nature of series wound D.C. motors, there is very little resistance to current flow and current will build up within this circuit loop exponentially (See FIG. 5(*a*)). At a pre-determined and set level of current, which may be varied to provide a greater or lesser degree of regenerative braking force, the thyristor 60 is made to switch off. With the thyristor 60 switched OFF as indicated in FIG. 4(*c*) the following set of circumstances pertain. Current had been flowing at a high rate within the field coil 62 and inductance 64 prior to the thyristor 60 switching off and thus there is electrical inertia within the circuit. This electrical inertia takes the form of magnetic energy within the coils of the inductance 64 and the field coil 62. When the thyristor 60 is switched off the energy dissipates through the motor diode 65 into the battery pack 45. When the thyristor 60 switches off the voltage at the thyristor 60 may rise to many hundreds of volts which is easily sufficient to cause current flow back into the battery 45 to provide recharging thereof.

Figure 5B:
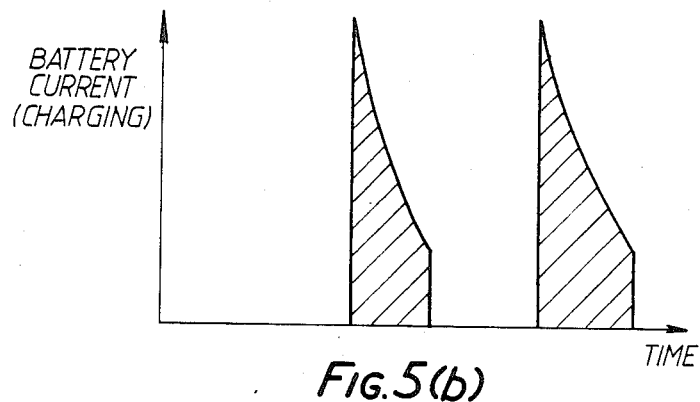

FIG. 5(*a*) shows the current flow in the armature 61 whilst the thyristor 60 is ON. The current is rising exponentially until the thyristor 60 switches off when the current flows into the battery 45. As the current in the armature falls to a pre-determined and set level the thyristor again switches on to repeat the cycle. The graph at FIG. 5(*b*) thus shows a typical current flow characteristic into the battery.

A smooth operation of the lifting platform 11 is thus obtained by pulsing control of the thyristor 60. Where a heavy load is being lowered the rate at which the thyristor 60 switches on and off will be greater than for a lighter load.

By the use of regenerative braking of the descending platform very precise control may be obtained of the position, acceleration and speed of the platform.

The figures given below in Table 1 show the calculated ideal energy consumptions to raise and lower a platform weighing 2500 kg with the indicated loads over a stroke of 1865 mm compared to measured energy levels on an actual loader according to the invention. Battery conditions were 72 volts and 75% charged.

TABLE 1

| LOAD (kg) | IDEAL Calculated (AHrs) | MEASURED Measured (AHrs) | EFFICIENCY % |
|---|---|---|---|
| Raise 7000 | 0.67 | 1.37 | 49 |
| Raise 4000 | 0.46 | 0.95 | 48 |
| Raise 2000 | 0.32 | 0.65 | 49 |
| Raise 0 | 0.18 | 0.40 | 45 |
| Lower 0 | −0.18 | −0.12 | 66 |
| Lower 2000 | −0.32 | −0.20 | 62 |
| Lower 4000 | −0.46 | −0.30 | 65 |
| Lower 7000 | −0.67 | −0.42 | 62 |

It may be seen that in all cases over 60% of the available potential energy of the raised platform is recouped during lowering thereof.

Table 2 below shows the overall energy consumed in a typical service on a Boeing 747 aircraft for the schedule indicated. Figures are compared between a loader according to the invention, a typical hydraulic platform loader and ideal power consumption assuming 100% efficiency.

TABLE 2

| FUNCTION | IDEAL ENERGY % | | LOADER OF INVENTION ACTUAL % | | TYPICAL HYDRAULIC LOADER % | |
|---|---|---|---|---|---|---|
| Raise/Lower | 8.35 | 56 | 14.49 | 50 | 26.20 | 55 |
| Driving | 4.01 | 27 | 8.00 | 28 | 14.85 | 31 |
| Bridge | 0.34 | 2 | 2.25 | 8 | 2.25 | 5 |
| Conveying | 0.80 | 5 | 2.70 | 9 | 2.70 | 6 |
| Services | 1.40 | 10 | 1.40 | 5 | 1.40 | 3 |
| TOTAL | 14.90 AHrs | | 28.84 AHrs | | 47.40 AHrs | |

| Duty per 747 aircraft service: | 1 × 7 tonnes pallet load and unload<br>3 × 4 tonnes pallet load and unload<br>8 × 2 tonnes container pair load and unload<br>400 meters driving<br>3 × bridge lifts<br>0.1 hour conveying<br>0.3 hour night lighting | |
|---|---|---|
| Assumptions: | Platform deck | 2500 Kgs |
| | Bridge deck | 2000 kgs |
| | Door height | 2.8 m |
| | Vehicle weight | 13 tonnes |
| | Rolling resistance | 200 N/Tonne |

It is apparent from Table 2 that the increase in overall efficiency of the loader of the present invention is mainly due to the superior efficiency achieved with the use of regenerative braking of the descending platform and the use of direct traction drive of the wheels by electric motors rather than using hydraulic transmission.

Although the present invention has been described with reference to aircraft loaders the same principles may equally well be applied to almost any lifting machine which uses electricity for power and has to control the descent of heavy loads. Machines such as forklift trucks operating in warehouses, for example, may employ the method and apparatus of the invention.

Other mechanical equivalents to scissor-jacks may also be used without departing from the scope of the invention.

Similarly, although the invention has been described employing two re-circulating ball-screw jacks located at the front of the lifting platform, a single centrally placed unit may be equally suitable in some applications on smaller machines.

I claim:

1. A method of operating a loader, the method comprising the steps of raising a platform by mechanical lifting means, the mechanical means including a gearbox, at least one ballscrew linked to said platform and being driven by at least one electric motor means powered from battery means, and then lowering said platform, the descent being controlled by regenerative braking, and wherein said at least one electric motor means is switched to function as generator means by control means, and power from said generator means is used to at least partially recharge said battery means.

2. Apparatus for raising and/or lowering of loads, said apparatus comprising a chassis having a variable height platform, said platform being connected to said chassis by means for maintaining said platform in a substantially level attitude irrespective of said platform height, mechanical lifting means for varying the height of the platform with respect to said chassis, electric motor drive means connected by transmission means to said mechanical lifting means for raising said platform, electrical energy storage means for powering said electric motor drive means, control means whereby the electric motor drive means may be switched to function as electrical generator means to provide retardation of said platform when being lowered, and means to direct electrical energy generated during lowering of said platform into said electrical energy storage means.

3. Apparatus according to claim 2 and wherein said chassis further includes wheels, and steering and drive means to at least some of said wheels.

4. Apparatus according to claim 3 and wherein said chassis further includes a bridge.

5. Apparatus according to claim 2 wherein said mechanical lifting means includes at least one ball-screw linked to said platform and driven by said electric motor drive means via a gearbox.

6. Apparatus according to claim 5 wherein said mechanical lifting means includes two ball-screws driven by a single electric motor.

* * * * *